US008467448B2

(12) United States Patent
Hsiang et al.

(10) Patent No.: US 8,467,448 B2
(45) Date of Patent: Jun. 18, 2013

(54) APPARATUS AND METHOD FOR FAST INTRA/INTER MACRO-BLOCK MODE DECISION FOR VIDEO ENCODING

(75) Inventors: Shih-Ta Hsiang, Schaumburg, IL (US); Faisal Ishtiaq, Chicago, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1950 days.

(21) Appl. No.: 11/559,965

(22) Filed: Nov. 15, 2006

(65) Prior Publication Data
US 2008/0112481 A1 May 15, 2008

(51) Int. Cl.
H04N 7/12 (2006.01)

(52) U.S. Cl.
USPC .................................... 375/240.03

(58) Field of Classification Search
USPC .................................... 375/240.03
See application file for complete search history.

(56) References Cited

U.S. PATENT DOCUMENTS

| 2004/0213348 | A1 | 10/2004 | Kim et al. | |
| 2005/0135484 | A1* | 6/2005 | Lee et al. | 375/240.16 |
| 2005/0286635 | A1* | 12/2005 | Kumar et al. | 375/240.16 |
| 2006/0062302 | A1* | 3/2006 | Yin et al. | 375/240.16 |
| 2006/0193385 | A1* | 8/2006 | Yin et al. | 375/240.12 |
| 2008/0025397 | A1* | 1/2008 | Zhao et al. | 375/240.13 |

FOREIGN PATENT DOCUMENTS

| WO | WO2004064398 A1 | 7/2004 |
| WO | WO2004080084 A1 | 9/2004 |
| WO | WO2005004491 A1 | 1/2005 |

OTHER PUBLICATIONS

ITU-T and ISO/IEC JTC 1, "Advanced video coding for generic audiovisual services," ITU-T Recommendation H.264 and ISO/IEC 14496-10 (MPEG4-AVC), Version 1: Mar. 2003, Cover Page, pp. 49-56, 85-88, 115-136.
K-P Lim, et al., "Text Description of Joint Model Reference Encoding Methods and Decoding Concealment Methods," JVT-K049, Munich, Germany, Mar. 2004.—pp. i-iv and 1-18.
Y.-W. Huang, et al., "Analysis, fast algorithm, and VLSI architecture design for H.264/AVC intra frame coder," IEEE Trans. Circuit and Systems for Video Technology, vol. 15, No. 3, pp. 378-401, Mar. 2005.
F. Pan, et al., "Fast mode decision algorithm for intraprediction in H.264/AVC video coding," IEEE Trans. Circuit and Systems for Video Technology, vol. 15, No. 7, pp. 813-822, Jul. 2005.
C-C Cheng, et al., "Fast three step intra prediction algorithm for 4×4 blocks in H.264," ISCAS 2005, pp. 1509-1512, 2005.

(Continued)

Primary Examiner — Jay Patel
Assistant Examiner — Richard Torrente

(57) ABSTRACT

A fast video encoder (100) and method (500) for selecting (809) Inter macro-block mode or intra macro-block mode is provided. The method can include estimating (502) a rate-distortion cost (801) of a plurality of predictors (203) for coding a video (201), selecting (504) a predictive coding mode for the video based on a minimization of the rate-distortion cost, and coding (505) the image using a predictive mode associated with the minimum rate-distortion cost. The rate-distortion cost can be estimated across Intra macro-block modes and Inter macro-block modes for reducing a computational complexity. Rate-Distortion costs can be terminated early (524) based on statistical information (522) across a plurality of predictors for increasing an encoding speed. A fast estimation of the rate-distortion cost associated with the Intra macro-block mode for making inter/intra macro-block mode decision in a video coding system by exploiting the coding statistics across prediction modes is presented.

5 Claims, 9 Drawing Sheets

OTHER PUBLICATIONS

B. Meng, et al., "Efficient intra-prediction algorithm in H.264," ICIP 2003, vol. III, pp. 837-840, 2003.

C. Kim, et al., "Feature-based intra-prediction mode decision for H.264," ICIP 2004, vol. 2, pp. 769-772, 2004.

J. Lee, et al., "Fast mode decision for H.264," ICME 2004, pp. 1131-1134, 2004.

Y. Zhang, et al., "Fast 4×4 Intra-prediction mode selection for H.264," ICME 2004, pp. 1151-1154, 2004.

C. Kim, et al., "A feature-based approach to fast H.264 Intra/Inter mode decision," ISCAS 2005, pp. 308-311, 2005.

L. Fan, et al., "Overview of AVS Video Standard," ICME 2004, pp. 423-426, 2004.

* cited by examiner

APPARATUS AND METHOD FOR FAST INTRA/INTER MACRO-BLOCK MODE DECISION FOR VIDEO ENCODING

FIELD OF THE INVENTION

The present invention relates to video coding, and more particularly, to low complexity video compression.

INTRODUCTION

The use of portable electronic devices and mobile communication devices has increased dramatically in recent years. Moreover, the demand for video enabled mobile devices is rapidly increasing. Video processing requires a significant amount of signal processing and places high processing demand on a mobile device having limited computational power and battery power. Video is generally received in a compressed format to reduce the amount of data required to represent the images. The compressed data also facilitates real time data delivery as the amount of data to be transmitted is decreased. Video encoding is the process of encoding the video into a compressed format. Video coding generally employs various prediction methods for removing redundancy in images. A video can be represented by a series of images presented over time. Each image can be represented by a plurality of macro-blocks, wherein a macro-block (MB) is a subset of image pixels from an image block region. An intra macro-block in an encoded image is predicted by coded neighboring pixels from the same image and exploits the strong statistical dependency in a natural image for efficient compression. An inter macro-block in an encoded image is predicted by the recovered pixels from the previously coded adjacent video frames and exploits the strong temporal redundancy in a video.

As video coding techniques evolve, new modes of operations are added to existing video encoding approaches. Such modes define a multitude of ways in which a macro-block can be encoded. One decision that modern video encoders can make, including the MPEG-4 AVC/H.264 encoders, is whether to encode a macro-block using an Inter macro-block mode or Intra macro-block mode. Both inter and intra macro-block modes may further contain several different macro-block prediction modes or types.

As an example, for intra-coding of the luminance component, the MPEG-4 AVC/H.264 standard defines the I4×4 intra MB type with 9 predictor modes of different orientations. In this MB type, each 4×4 block from a given macro-block of 16×16 block size is sequentially encoded with the pixel values predicted by the recovered pixels from the encoded neighboring image region. This MB type allows intra prediction to be dynamically adapted to the characteristics of the local image area and thus is particularly efficient for compressing image regions with high texture and edges. The standard also defines the I16×16 intra MB type with four candidate predictors for encoding relatively homogeneous image regions.

Such rich predictor mode sets provided by the recent video coding system can significantly improve the efficiency of video compression. Nevertheless, an encoder must evaluate all the prediction types to select the prediction type providing the best video compression performance. In the course of evaluating the various prediction types/modes for identifying performance improvements of the intra MB mode and inter MB mode coding, the encoder consumes significant computational resources. Accordingly, a need exists for a real-time, high-performance, mode selection algorithm that provides the compression performance near that of an exhaustively rate-distortion optimized approach but with significantly reduced computational load to identify the most efficient prediction mode.

BACKGROUND ART

A general framework for the rate-distortion optimized MB mode decision is provided by the minimization of the Lagrangian cost function $$J(m, \lambda) = D(m) + \lambda^* R(m), \quad \text{EQ 1}$$

where D measures the coding distortion, R represents the encoding bit cost, λ is Lagrangian multiplier, and m is one of macro-block coding modes/types supported in a video coding system. The mode leading to the lowest Lagrangian cost function among all macro-block coding modes is selected for encoding the current macro-block.

The calculation of actual coding distortion and bitrate for each candidate mode involves relatively high computational complexity. Therefore, the Lagrangian cost function is often approximated by the sum of absolute difference (SAD), given by $$SAD_{X \times Y} = \sum_{X \times Y} |I(x, y) - I^*(x, y)|$$

where X and Y are the block width and height for SAD calculation, and I (x, y) and I* (x, y) represent the pixel value of the source input image at location (x, y) and its corresponding predicted pixel value from the recovered image regions, respectively.

For example, for the MPEG-4 AVC/H.264 video coding, one of the macro-block mode decision algorithm in the JVT reference software implementation approximates the Lagrangian R-D cost for I16×16 MB type, $J_{I16 \times 16}$, by $$J_{I16 \times 16}(\lambda) \equiv J(I16 \times 16, \lambda) = \min_{0 \le m < 4} SAD^m_{16 \times 16}, \quad \text{EQ 2}$$

and the Lagrangian R-D cost for the I4×4 MB type, $J_{I4 \times 4}$, by $$J_{I4 \times 4}(\lambda) \equiv J(I4 \times 4, \lambda) = 24 * \lambda + \sum_{i,j} \left( \min_{0 \le m < 9} SAD^m_{4 \times 4}(i, j) + QP(\lambda) \right), \quad \text{EQ 3}$$

where (i, j) indicates the index for the current 4×4 block within the macro-block and QP(λ) accounts for the bit cost for encoding prediction mode information and is equal to 0 for the predicted mode and 4*λ otherwise.

The optimal macro-block mode decision among all candidate modes typically proceeds in an exhaustive approach, where rate-distortion costs are independently and fully calculated for individual candidate modes and the decision logic then selects the mode with a minimum R-D cost. An example related to macro-block mode decision in the MPEG-4 AVC/H.264 coding system is depicted in FIG. 4, where the optimal macro-block mode is selected among MPEG-4 AVC/H.264 macro-blocks types Inter, I16×16 and I4×4. The exhaustive approach then need to estimates the rate-distortion cost for each of three macro-block modes. Specifically, the calculation of the I4×4 R-D cost based on EQ 3 requires the reconstructed pixels from the top and left neighboring 4×4 blocks for predicting each 4×4 block inside the current macro-blocks. The cascaded encoding and decoding operation with high computational complexity therefore need to be performed on the individual 4×4 block in the macro-block to generate the recovered pixels for signal prediction. The resulting computational complexity is thus quite significant and often accounts for a large portion of the computational load of the overall encoding system.

Performing such an exhaustive search demands a vast amount of computational resource and is inefficient for practical video coding applications. Accordingly, embodiments of the invention are directed to a method that reduces the complexity associated with the search for the lowest cost function, J, by effectively exploiting the accumulated coding statistics collected across different prediction modes. Specific embodiments of the invention are developed for fast estimation of the rate-distortion cost associated with the intra macro-block mode for speed up of the encoder macro-block mode decision operation.

SUMMARY

Embodiments of the invention are directed to a method for fast video encoding on a complexity constrained device. The method can include estimating a rate-distortion (R-D) cost for a plurality of predictors for coding a video, selecting a predictive coding mode for the video based on a minimization of the rate-distortion cost, and coding the image macro-block using the predictive mode associated with the minimum rate-distortion cost. The rate-distortion cost can be estimated across intra macro-block modes and inter macro-block modes for reducing the computational complexity associated with rate-distortion costs of intra macro-block modes.

The method can include evaluating statistical information across the plurality of predictors collected from previous rate-distortion estimations, and providing an early termination for computing rate-distortion costs that exceed a threshold based on the statistical information. The early termination can decrease computational complexity and increase speed of the video encoding. Efficiently estimating a rate-distortion cost can include generating a coarse approximation of the rate-distortion of a predictor, comparing the approximated rate-distortion cost to a threshold, and determining whether to refine the estimation of the rate-distortion cost in view of the coarse approximation versus the threshold value. The steps of generating, comparing, and determining can be repeated for the plurality of predictors. The predictor associated with the lowest rate-distortion cost can be selected.

BRIEF DESCRIPTION OF THE DRAWINGS

The features of the system, which are believed to be novel, are set forth with particularity in the appended claims. The embodiments herein, can be understood by reference to the following description, taken in conjunction with the accompanying drawings, in the several figures of which like reference numerals identify like elements, and in which:

DETAILED DESCRIPTION

Figure 1:
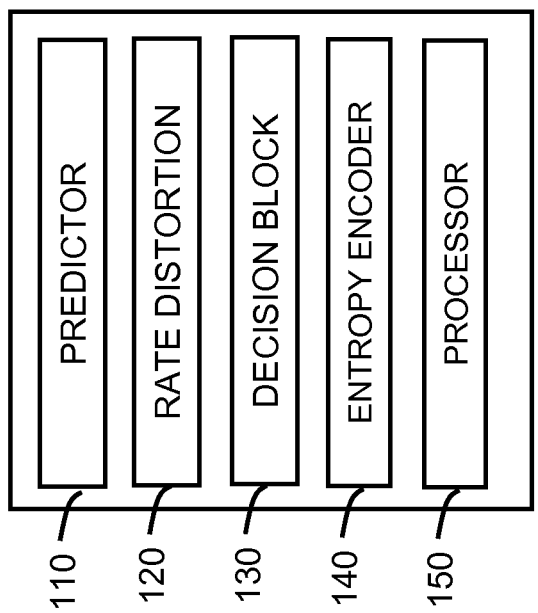
FIG. 1 is a block diagram of a fast video encoder in accordance with the embodiments of the invention.

While the specification concludes with claims defining the features of the embodiments of the invention that are regarded as novel, it is believed that the method, system, and other embodiments will be better understood from a consideration of the following description in conjunction with the drawing figures, in which like reference numerals are carried forward.

As required, detailed embodiments of the present method and system are disclosed herein. However, it is to be understood that the disclosed embodiments are merely exemplary, which can be embodied in various forms. Therefore, specific structural and functional details disclosed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiment herein.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

The term "prediction" can be defined as estimating one or more features of an image from previous image data, or neighboring data in the image. The term "rate-distortion" can be defined as a function of encoding bitrate and distortion associated with representing one or more pixel values of an image. The term "video" can be defined as a series of images across time. The term "macro-block" can be defined as a set of pixels covering a block region in an image. The term "intra macro-block mode" can be defined as a prediction using local pixel neighbors in an image. The term "inter macro-block mode" can be defined as a prediction using pixels of an image across time. It should be noted that the defined intra and inter macro-block modes may include more than one macro-block coding mode or type in a video coding system. For instance, the intra macro-block mode has two macro-block coding types I16×16 and I4×4 and the inter macro-block mode has four macro-block coding types I16×16, I8×16, I16×8, and I8×8 in the MPEG-4 AVC/H.264 baseline profile. When there are more than one intra (or inter) macro-block coding mode/type being defined in a video coding system, then the rate-distortion cost of the intra (or inter) macro-block mode is defined to be the minimum rate-distortion cost among all intra (inter) macro-block coding modes or types.

Briefly, embodiments of the invention provide an efficient algorithm for fast inter MB mode or intra MB mode decision.

The decision mechanism of the algorithm decides between coding a MB using an inter or intra prediction mode. Specifically, a decision framework for fast estimation of the rate-distortion (R-D) costs associated with the Intra MB types is provided. The decision framework makes optimal MB mode decision between the intra and inter MB types based on the rate-distortion criterion evaluated across a plurality of predictors. The decision mechanism effectively exploits information across the predictor types for reducing the computational complexity of a rate-distortion cost calculation. Calculations of rate-distortion costs for certain predictors are terminated early during evaluation to reduce computational complexity and thereby increase the speed of video encoding.

Referring to FIG. 1, a fast video coder 100 is shown. The fast video coder 100 can be a hardware or software apparatus for efficiently encoding video. The functions of the fast video coder 100 may be implemented in software by a processor such as a microprocessor or a digital signal processor (DSP) as is known in the art. The functions of the fast vide coder may also be implemented in hardware such as an ASIC or FPGA as is known in the art. The fast video encoder 100 can receive a stream of video data representing a plurality of images over time. The fast video encoder 100 can evaluate the video data and efficiently select a prediction mode that is either one of a plurality of inter MB modes or one of a plurality of intra modes for video compression. In practice, the selection is based on minimizing a rate-distortion cost function across a plurality of predictors and selecting the predictor having the minimum cost function value. The fast vide encoder 100 can encode the video data from the individual macro-block based on the prediction mode selected.

The fast video coder 100 can include at least one predictor 110 for coding a plurality of image frames and generating a prediction error, a rate-distortion block 120 coupled to the predictor 110 for receiving the prediction error and estimating a rate-distortion cost associated with the coding for a plurality of predictor modes, and a decision block 130 operatively coupled to the rate-distortion block for evaluating the rate-distortion and selecting a predictive mode based on a minimization of the rate-distortion cost. A predictive mode can be an intra macro-block mode or an inter macro-block mode. The fast video coder 100 can include a processor 150 cooperatively connected to an output of the decision block 130 and inputs of the predictor 110 and entropy encoder 140 for compressing an input image.

An entropy encoder 140 can be operatively coupled to the decision block 130 and the processor 150 for coding the plurality of macro-blocks using either an intra macro-block mode or an inter macro-block mode selected by the decision block 130. In one embodiment, the decision block 130 can compare a rate-distortion cost associated with the plurality of predictor types for predicting a best mode for coding a macro-block in an MPEG-4 AVC/H.264 coding system, wherein the best mode corresponds to the predictor type that minimizes a rate-distortion cost.

Figure 2:
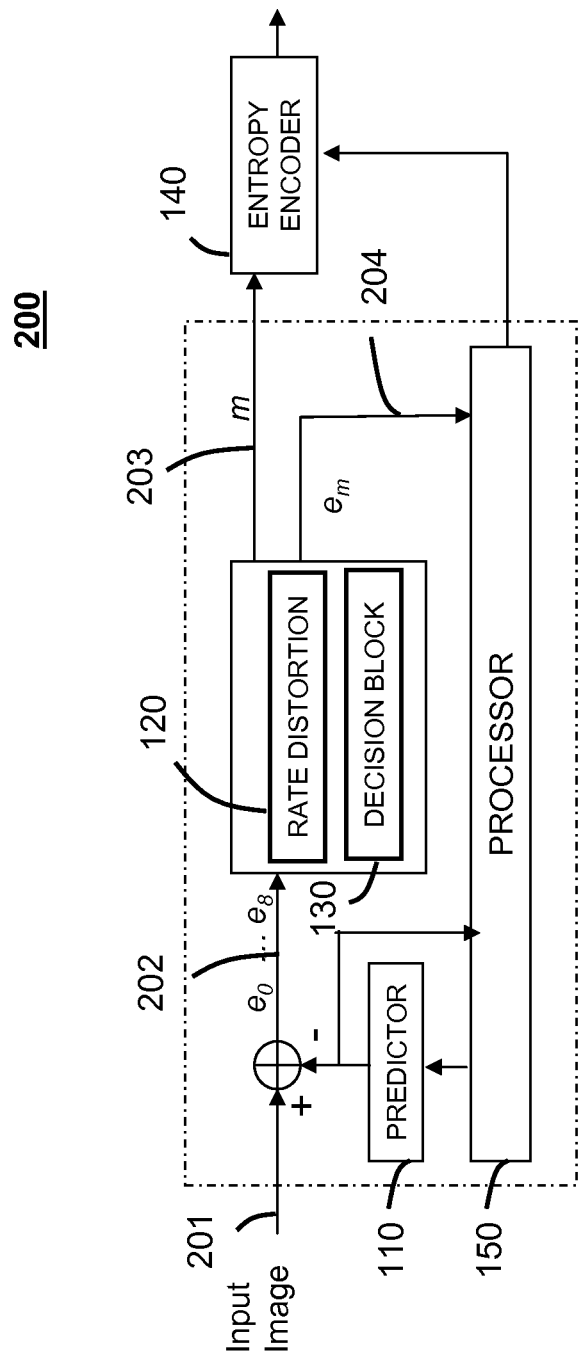
FIG. 2 is a schematic of the fast video encoder of FIG. 1 in accordance with the embodiments of the invention.

Referring to FIG. 2, a schematic of the fast video encoder 100 of FIG. 1 is shown. The fast video encoder 100 can receive an input image 201 which may constitute one of many images of a video. The input image 201 consists of non-overlapped macro-blocks as basic coding units. The predictor 110 can predict one or more features of the macro-block regions in the image 201 based on previously processed images or the coded macro-blocks in the current image. A prediction error 202 can be generated based on the difference of the prediction and the image 201. Briefly, the fast video encoder 100 provides efficient video compression by encoding differences in the images over time. The fast video encoder 100 evaluates a plurality of prediction modes implemented by the predictor 110 for compressing the individual macro-blocks of the image. The prediction mode can be an inter MB mode or intra MB mode. That is, the predictor 110 can implement one of a plurality of inter MB modes or one of a plurality of intra MB modes for compressing the current macro-block in the image 201. The rate distortion 120 can estimate the rate-distortion costs associated with the candidate prediction modes for compressing the current macro-block. The decision block 130 can finally select the prediction mode, m 203, that provides the best efficiency for video compression of the current macro-block. The processor 150 can compress the prediction error 204 for a given prediction mode, m 203. The entropy encoder 140 can then code the current macro-block in the image 201 based on the predictor mode, m 203, selected by the decision block. Notably, one novel aspect of the invention is an efficient means by which the rate distortion unit 120 estimates a cost function. In particular, the cost function identifies whether or not evaluation of prediction mode should continue to improve compression efficiency.

Figure 3:
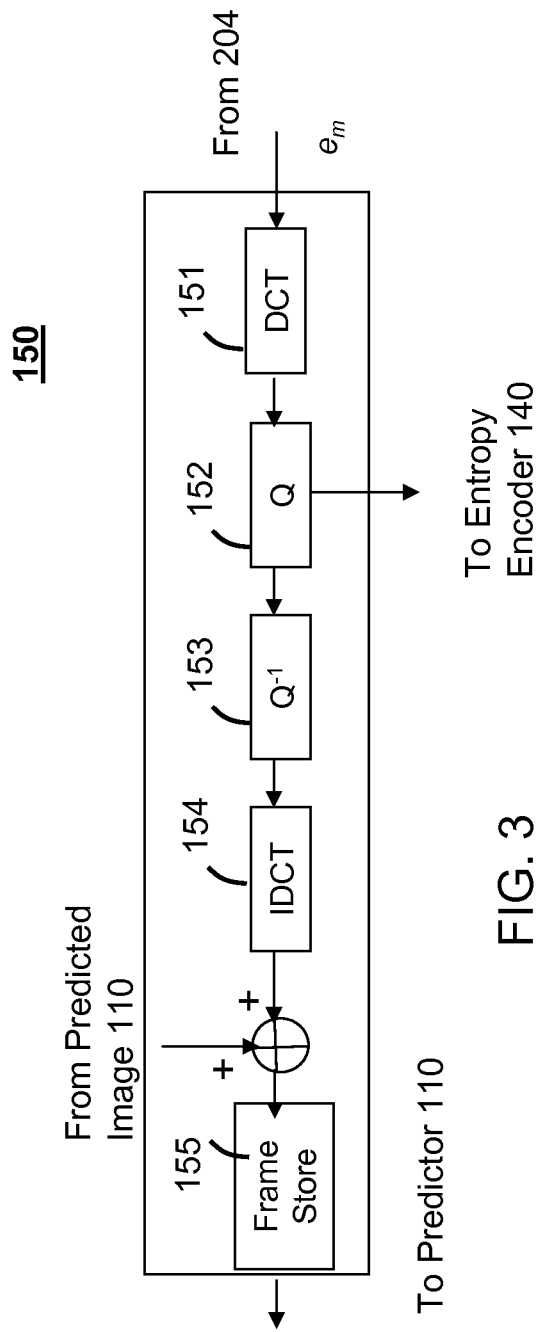
FIG. 3 is a schematic of the processor of the video encoder of FIG. 2 in accordance with the embodiments of the invention.

Referring to FIG. 3, a schematic of the processor 150 is shown. Briefly, the processor 150 performs an encoding and decoding process for reconstructing the coded image. The processor 150 includes a Discrete Cosine Transform (DCT) block 151 for mapping the pixels from a macro-block of the input image to a set DCT coefficients, a Quantizer (Q) 152 for quantizing the set of DCT coefficients to produce a set of quantizer symbols, an Inverse Quantizer 153 for converting the set of quantizer symbols to a set of reconstructed DCT coefficients, and an Inverse Discrete Cosine Transform (IDCT) block 154 for mapping the set of reconstructed DCT coefficients back to macro-block pixel values. The processor 150 can also include a frame store for providing a history of previously coded images. The components 151-155 of the processor 150 are known in the art. The predictor 110 can utilize the reconstructed coded image regions to predict the macro-block pixel values subject to compression in the input image.

The fast video encoder 100 with an inter-macro mode uses one or more reconstructed pictures to predict pixel values of a current macro-block (MB) after motion compensation and is able to effectively remove strong temporal redundancy in input source video along a motion trajectory. The fast video encoder 100 with an intra-macro mode uses the coded neighboring image regions in the current frame to predict pixel values of a current macro-block (MB) and is able to effectively exploit strong spatial statistical dependency in the input image.

The rate-distortion unit 120 and the decision block 130 work together to identify the predictor mode that achieves highest compression and video reconstruction quality. The rate-distortion cost can be the Lagrangian cost function defined in EQ1 or other metrics for rate-distortion evaluation. Each macro-block mode can be associated with a rate-distortion cost depending on the encoding bitrate and distortion. It should also be noted, as being mentioned previously, that each macro-block mode can have a plurality of macro-block predictor modes and sub-modes.

Figure 4:
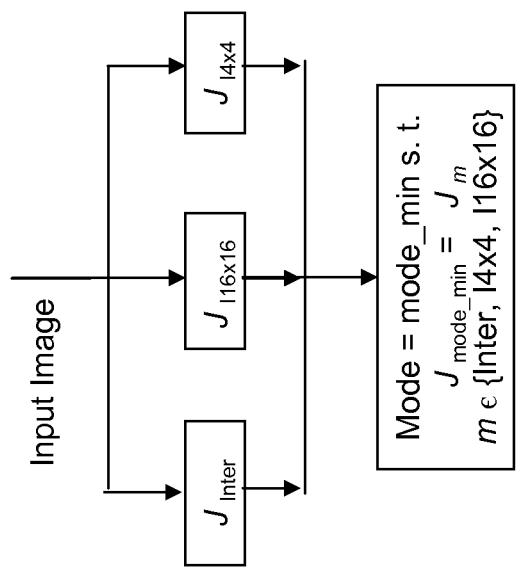
FIG. 4 is a flow chart illustrating the conventional exhaustive approach to rate-distortion optimized macro-block mode decision.
Figure 5:
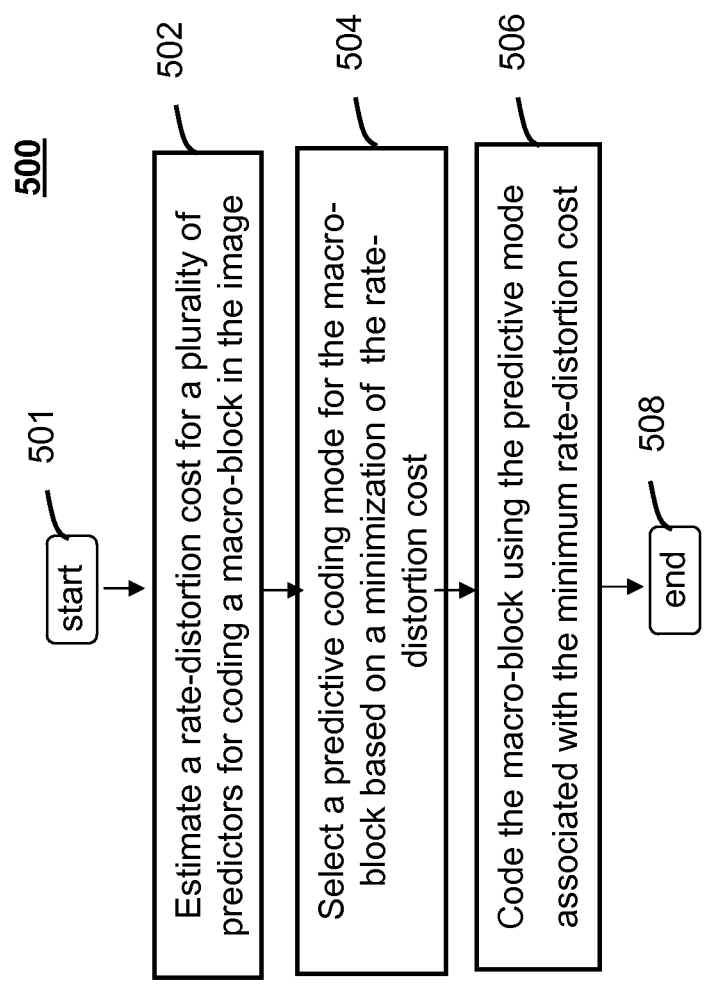
FIG. 5 is a method for fast video encoding in accordance with the embodiments of the invention.

Referring to FIG. 5, a method 500 for intra/inter mode decision is shown. The method 500 can be practiced with more or less than the number of steps shown. To describe the method 500, reference will be made to FIGS. 1, 2, and 4 although it is understood that the method 500 can be implemented in any other manner using other suitable components. In addition, the method 500 can contain a greater or a fewer number of steps than those shown in FIG. 5.

At step 501, the method 500 can start. The method 500 can start in a state wherein an input video has been provided to the fast video encoder of FIG. 1 for compression. At step 502, a rate-distortion cost can be estimated for a plurality of predictors for coding a video. For example, referring to FIG. 2, the rate-distortion unit 120 can estimate the Lagrangian cost of EQ 1 from the prediction error 202. At step 504, a predictive coding mode for the video can be selected based on a minimization of the rate-distortion cost. For example, referring to FIG. 2, the predictor 110 can employ a plurality of inter MB modes and a plurality of intra MB modes for prediction of macro-block pixels and the rate-distortion unit 120 can estimate the rate-distortion cost associated with each predictor mode. The decision block 130 can select the predictor mode that achieves the lowest rate-distortion cost. At step 506, the image can be coded using the predictive mode associated with the minimum rate-distortion cost. In particular, a rate-distortion cost can be estimated across intra macro-block modes and inter macro-block modes for reducing the computational complexity associated with rate-distortion costs of intra macro-block modes. At 507, the method 500 can end.

Figure 6:
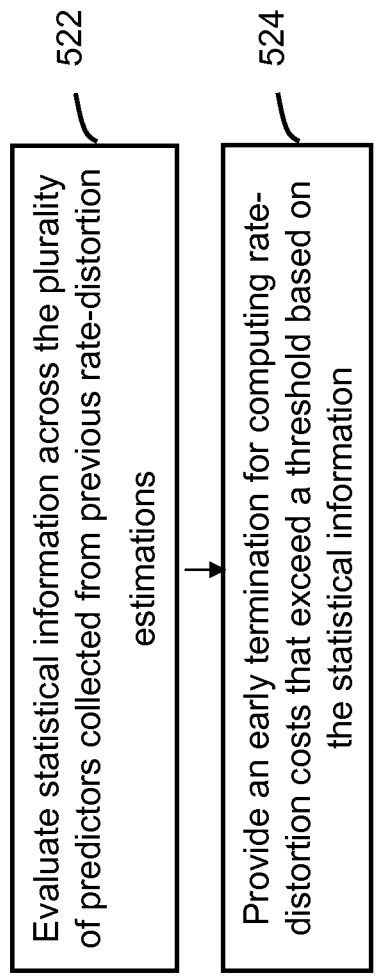
FIG. 6 is a method for early termination of rate-distortion costs in accordance with the embodiments of the invention.

Referring to FIG. 6, the method 500 can further include evaluating (522) statistical information across the plurality of predictors collected from previous rate-distortion estimations, and providing (524) an early termination for computing rate-distortion costs that exceed a threshold based on the statistical information. Early termination decreases computational complexity and increases speed of the video encoding. For example, referring to FIG. 3, the Frame Store 155 can save previously coded image frames and coded image regions in the current image. The predictor 110 can predict the current macro-block from the previously coded image region with one of a plurality of macro-block predictor modes. The rate-distortion unit 120 can then estimate the rate-distortion cost for each candidate predictor mode. The decision unit 130 can evaluate the costs and rank the predictors by their respective rate-distortion costs. During processing of an image, the decision unit 130 can update the cost of each predictor and the latest minimum rate-distortion cost and determine which predictors should be considered further. The decision unit 130 can provide an early termination threshold that determines prediction modes are unlikely to achieve a minimum cost with the rate-distortion cost greater than the threshold value. The rate-distortion cost estimation for a given prediction mode can be stopped immediately once the accumulated cost reaches the termination threshold.

Figure 7:
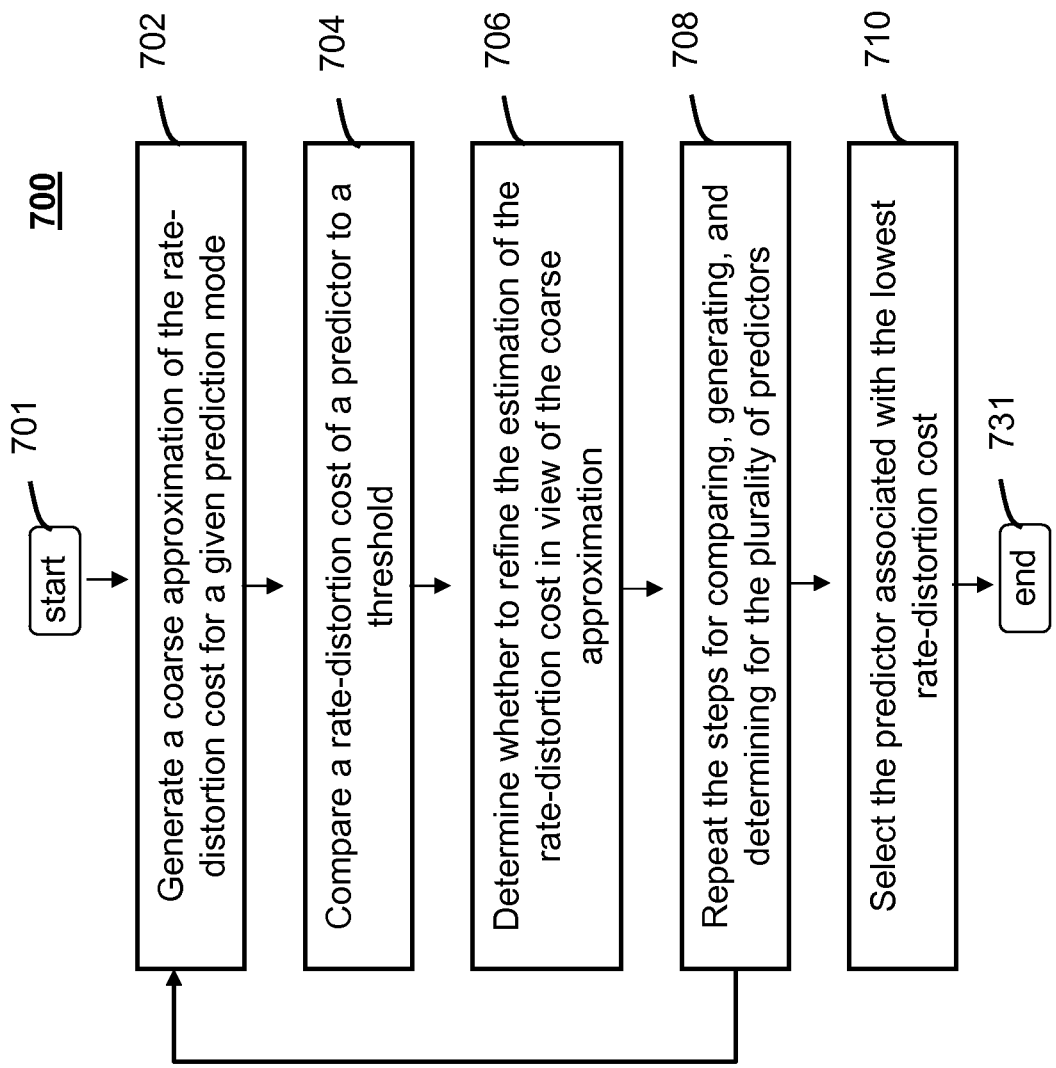
FIG. 7 is a method for finding the optimal mode with a minimum rate-distortion cost among a plurality of the predictor modes in accordance with the embodiments of the invention.

Referring to FIG. 7, a method 700 for fast mode selection is shown. The method 700 can be practiced with more or less than the number of steps shown. The method 700 is not strictly limited to the order in which the steps are listed in the method 700. In addition, the method 700 can contain a greater or a fewer number of steps than those shown in FIG. 7. Briefly, referring back to FIG. 2, the rate-distortion unit 120 evaluates a rate-distortion cost associated with a plurality of predictors. The decision block 130 selects the predictor mode for the current macro-block that provides the lowest rate-distortion cost. The method 700 is a broad overview of the inter/intra mode decision logic employed by the decision block 130 of the fast video encoder 100. In particular, the fast video encoder 100 evaluates the minimum rate distortion cost across the predictor modes for determining when to skip or complete a full rate-distortion cost calculation.

At step 702, a coarse approximation of the rate-distortion cost associated with a predictor mode is evaluated. At step 704, the approximated R-D cost is compared against a threshold determined by the accumulated coding statistics. At step 706, a decision can be made to decide whether there is a need to further refine the estimation of the rate-distortion cost in view of the coarse approximation versus the threshold value. For example, if the approximated cost for a given prediction mode is greater than the assigned threshold, we can be confident that the actual R-D cost for this mode is unlikely to the lowest cost among all candidate modes. The further refinement of rate-distortion estimation for this mode is thus skipped to save the computational resource. At step 708, the steps of generating, comparing and determining for the plurality of predictors can be repeated. This allows for the fast evaluation of multiple predictor types without having to complete full R-D cost estimation for each prediction type to completion. In this way, certain predictors exhibiting poor prediction performance can be terminated early to reduce computations. In contrast, promising predictors can be further evaluated for rate-distortion comparison. At step 710, the predictor associated with the lowest rate-distortion cost can be selected.

Figure 8:
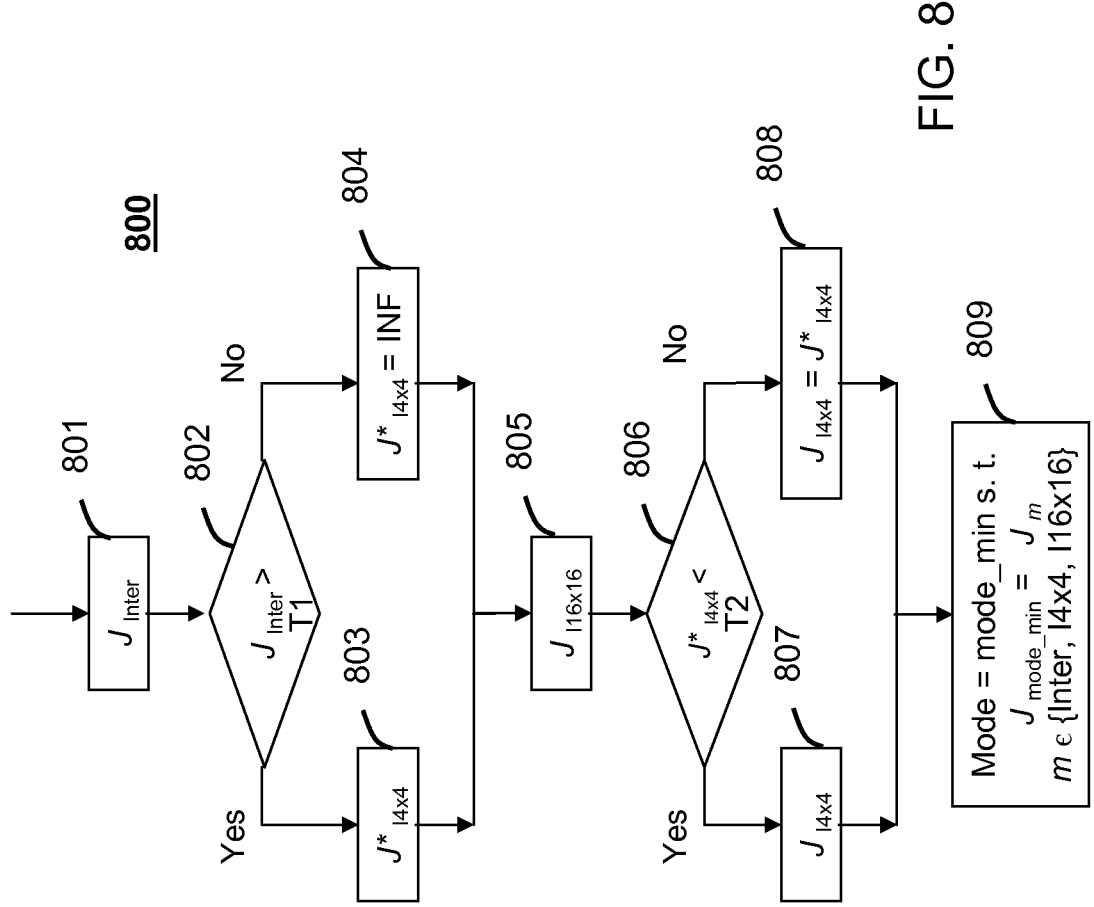
FIG. 8 is a method for selecting a predictive mode in accordance with the embodiments of the invention.

Referring to FIG. 8, a flowchart 800 for selecting a predictive mode using a rate-distortion cost is shown. Specifically, the flowchart 800 provides a fast algorithm that substantially reduces the computational complexity associated with the intra R-D cost estimation for making optimal intra/inter macro-block mode decision for MPEG-AVC/H.264 coding and thus improves speed performance of the overall video coding system. The flowchart 800 includes calculations for the rate-distortion costs presented in method 700 in FIG. 7 for deciding between inter mode or intra mode predictive coding. In particular, the flowchart 800 identifies rate-distortion costs, J, calculated using EQ 1 for various predictor modes, m (See FIG. 2). The macro-block mode decision based on a rate-distortion cost for an inter MB mode, a rate-distortion cost for the first intra MB mode with a 4×4 predictive coding unit, and a rate-distortion cost for the second intra MB mode with a 16×16 predictive unit is shown. This flowchart, for instance, can be applied to the macro-block mode decision in the MPEG-4 AVC/H.264 video coding system, where the defined macro-block coding types can be loosely grouped into these three predictor modes with the Intra rate-distortion costs given by EQ (2) and (3)

The flowchart can include more than the number of steps shown which is presented merely for describing one example. For example, a plurality of intra MB modes using various predictive coding block sizes can be included for determining the best predictor mode, m. Referring back to FIG. 2, the rate-distortion unit 120 can calculate the costs, J, and the decision unit 130 can perform the logic steps of the flowchart.

Briefly, the intra macro-block mode may have a large number of different predictor modes to choose from (for example, 9 predictor modes for each 4×4 block for the MB type I4×4 and 4 predictor modes for the MB type I16×16 in MPEG-4 AVC/H.264). The conventional exhaustive approach to macro-block mode decision, illustrated in FIG. 4, calculates rate-distortion costs in isolation for all the predictor modes and is computationally very expensive. Most prior research efforts on lowering the computational complexity associated with the estimation of the intra MB rate-distortion cost attempt to reduce the number of potential predictor modes, m 203 (See FIG. 2), for decision making evaluation. The cost estimation for each potential predictor mode is either fully calculated or skipped completely. In contrast, the flowchart 800 of FIG. 8 introduces an algorithmic stage for coarsely estimating an intra mode cost (e.g. the I4×4 MB cost), thus allowing for the testing of all predictor modes at a substantially lower complexity level. In this way, the decision mechanism is able to utilize information from all predictor modes when making the decision. Additionally, the flowchart 800 results in an increase in encoding speed by early termination of the Lagrangian cost calculation. As previously presented in step 524 of FIG. 6, statistical information across MB types is collected and evaluated from the past cost estimation stages in making the predictor mode decision.

At step 801, an inter rate-distortion cost, $J_{Inter}$, can be computed for coding using the inter macro-block mode. The initial minimum rate-distortion cost, $J_{min}$, for reference is set to $J_{Inter}$. At step 802, the inter rate-distortion cost can be compared to a first threshold, T1. This threshold value can be a constant or adjusted dynamically based on the accumulated coding statistics. If the inter rate-distortion cost is greater than the first threshold, at step 803 a rate-distortion cost can be computed using a first intra macro-block mode for generating a coarse approximation of the rate-distortion cost. Otherwise, the rate-distortion cost approximation for the first intra mode is skipped and the related cost is just set to infinity at step 804 such that the first intra mode will not be chosen by the mode decision logic in the future. For example, referring back to the fast video encoder 100 of FIG. 2, the rate distortion unit 120 can perform the following tasks to practice the flowchart steps 801-804:

1. Compute a Lagrangian cost of the inter MB type, $J_{Inter}$, using EQ (1). The minimal MB Lagrangian cost, $J_{min}$, is then initially set to $J_{Inter}$.
2. If the resulting Inter R-D cost, $J_{Inter}$, is greater than the threshold T1, then proceed to get a coarse approximation of the I4×4 Lagrangian cost, $J_{I4\times4}^*$. Otherwise, the mode I4×4 is not selected by setting $J_{I4\times4}^*$ to Infinity.

At step 805, a second intra rate-distortion cost can be computed using a second intra macro-block mode. The second intra rate-distortion cost can then be compared to the latest minimum rate-distortion cost and the minimum rate-distortion cost can be updated based on the comparing. For example, the minimum rate-cost can be set to the second intra rate-distortion cost if the second intra rate-distortion cost is less than the latest minimum rate-distortion cost.

For example, referring back to the fast video encoder 100 of FIG. 2, the rate distortion unit 120 can perform the following tasks to practice the flowchart step 805:

3. The Lagrangian cost of I16×16 MB type, $J_{I16\times16}$, is estimated next and the minimal MB Lagrangian cost, $J_{min}$, is updated with the resulting MB cost.

At step 806, the approximated first intra rate-distortion cost can be compared to a second threshold, T2. This threshold value can be adjusted dynamically based on the latest minimum rate-distortion cost or other accumulated coding statistics. One choice, for instance, is having T2=$J_{min}$+c2, where c2 is a constant, If the approximated rate-distortion cost is smaller than this threshold, it indicates the first intra mode is a good candidate mode for efficient compression of the current macro-block. The rate-distortion cost is then further refined at step 807. Other wise (the approximated first intra rate-distortion cost greater than the second threshold), at step 808, the first intra rate-distortion cost is not further refined in view that the first Intra mode is unlikely to be the optimal macro-block mode for encoding current macro-block.

For example, referring back to the fast video encoder 100 of FIG. 2, the rate distortion unit 120 can perform the following tasks to practice the flowchart steps 806-808:

4. When the approximated cost, $J_{I4\times4}^*$, is lower than the threshold T2, further refine the estimation of the I4×4 Lagrangian cost. Otherwise it is assumed that $J_{I4\times4}^*$ is a good approximation for $J_{I4\times4}$ At step 809, the inter rate-distortion cost, the first intra rate-distortion cost, and the second intra rate-distortion cost can be compared. Thereafter, a predicting mode corresponding to the lowest rate-distortion cost can be selected.

For example, referring back to the fast video encoder 100 of FIG. 2, the decision unit 130 can perform the following tasks to practice the flowchart steps 806-808:

5. Choose the MB type associated with the minimal Lagrangian R-D cost.

It should be noted that the computational complexity for evaluating the plurality of prediction modes can be significantly reduced by early termination given knowledge of the most recent minimal MB Lagrangian cost, $J_{min}$. For example, once the rate-distortion cost accumulated from individual 4×4 block rate-distortion costs reaches $J_{min}$, the algorithm blocks $J_{I4\times4}^*$ and $J_{I4\times4}$ (803 and 807 of FIG. 7) can skip the calculations of rate-distortion costs for all the remaining unprocessed 4×4 blocks in the current macro-block.

The pseudo code for the flowchart 800 of FIG. 8 invention is given below:

```
Fast_MB_Type_Selection( )
{
    J_min = J_Inter = Inter_MB_RD_Cost( );
    if (J_Inter > T1)
        J_I4x4* = I4x4_MB_RD_Cost_Approx(J_min) ; // The block diagram
for the
                                                  // embodiment is given in FIG. 8
    else
        J_I4x4* = INF;
    J_I16x16 = I16x16_MB_RD_Cost(J_min);
    if (J_I16x16 < J_min)
        J_min = J_I16x16;
    if (J_I4x4* < T2)
        J_I4x4 = I4x4_MB_RD_Cost(J_min); // The system block diagram is
                                         // depicted in FIG. 1
    else
        J_I4x4= J_I4x4*;
    Choose MB type equal to mode_min such that J_mode_min = min J_m, where m ε {Inter, I4 × 4, I16 × 16}
                      m

}
```

Recall that the calculation of I4×4 rate-distortion cost given by EQ 3 need to obtain the reconstructed pixels from the top and left neighboring 4×4 blocks for each 4×4 block inside the current macro-blocks and thus is involved with all operations in the entire codec module as indicated by dotted region in FIG. 2. Specifically, it needs to perform one cascaded DCT/quantization/de-quantization/IDCT operation and 9 prediction and SAD computations for each 4×4 block and may consume significant computational resource of a video coding system. The related computational complexity is quite significant and may become a complexity bottleneck of the overall video coding system.

Figure 9:
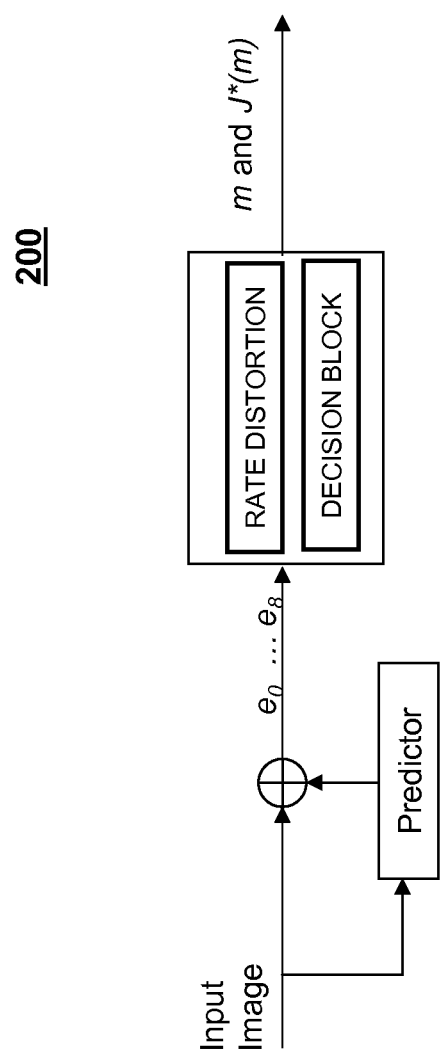
FIG. 9 is a schematic for fast approximation of the I4×4 rate-distortion cost in accordance with the embodiments of the invention.

To lower the computational complexity for evaluation of the I4×4 MB rate-distortion cost, an additional algorithmic block $J_{I4 \times 4}^*$, 808 in FIG. 8, is introduced to provide an approximate estimation of the Lagrangian cost for the I4×4 MB type at considerably lower computational complexity in the algorithm depicted in the flowchart 800. It allows the high complexity operation for the I4×4 rate-distortion calculation, $J_{I4 \times 4}$, to be skipped after it has been identified by the approximated cost, $J_{I4 \times 4}^*$, that I4×4 is unlikely to be the best macro-block mode. An embodiment of this algorithmic block is depicted in FIG. 9, where the original source pixel samples are employed for the SAD calculation. In this way, the high complexity cascaded DCT/Q/Q$^{-1}$/IDCT operation typically employed by a conventional algorithm is bypassed, in a clear contrast to the conventional scheme represented by the dotted region in FIG. 2. This strategy is justified by the fact that the expected energy of actual residual signal is given by $$E[e^2] = E[e_p^2] + \sigma_x^2 \Sigma_i w_i^2 > E[e_p^2],$$

where $e_p$ is the prediction error from using original source samples, $\sigma_x^2$ is variance of quantization error, and $\{w\}_x$ are predictor weights under the assumption that the quantization error signal is independently identical distribution (i. i. d.) with a variance $\sigma_x^2$. We can therefore consider $J_{I4 \times 4}^*$ as a lower bound of the actual I4×4 Lagrangian cost $J_{I4 \times 4}$ and skip the I4×4 RD cost check without much performance loss given $J_{Inter} < J_{I4 \times 4}^*$.

The computational complexity is further reduced by early termination of the rate-distortion (R-D) cost calculation based upon exceeding a cost threshold. For example, referring back to FIG. 2, the decision block 130 evaluates statistical information across macro-block types collected from previous rate-distortion estimations and provides an early termination threshold for computing a Lagrangian cost. As another example, referring back to FIG. 8, once the rate-distortion cost accumulated from individual 4×4 block rate-distortion costs reaches the termination threshold $J_{min}$, the algorithm blocks $J_{I4 \times 4}^*$ and $J_{I4 \times 4}$ (803 and 807 of FIG. 7) can skip the prediction and SAD calculation steps and $J_{I4 \times 4}$ can additionally skip the cascaded DCT/Q/Q$^{-1}$/IDCT operation associated with the estimation of rate-distortion costs for all the remaining unprocessed 4×4 blocks in the current macro-block.

In one embodiment, additional computation reduction is achieved by using the down-sampled pixel grid (by 2 in both spatial dimensions) to approximate the 4×4 block SAD by $$SAD_{4 \times 4}^* = 4 \cdot \sum_{x=0,2;y=0,2} |I(x,y) - I*(x,y)|,$$

where (x, y) indicates the pixel coordinate within a given 4×4 block for SAD calculation. Alternate embodiments can choose to use all of the samples or utilize alternate pixel locations in the down-sampled pixel grid.

Further improvements in speed performance can be gained by optionally "turning off" some less frequently used prediction modes for cost calculation. The pseudo code for this embodiment is given as follows:

```
I4x4_MB_RD_Cost_Approx(J_min)
{
    cost = α * λ;       // α is a bias factor (6 in preferred embodiment)
    for i = 0 : 3
        for j = 0 : 3           // (i, j) is the block index inside
                                // the macro-block
            cost += Fast_Block_RD_Cost_Approx(i, j);
        if ((cost * 4) > J_min)
            return INF;
    return cost * 4;
}
Fast_Block_RD_Cost_Approx(i, j)
{
    min_cost = INF;
    for mode = 0 : Total_Num_4x4_Modes - 1
        if (mode_flag[mode] == OFF)
            continue;
        Predict_Pixels(i, j, mode);
        cost = SAD *_{4x4}^{mode} (i, j);
        pre_mode = Mode_Prediction(i, j);
        if (mode != pre_mode)
            cost += λ;
        if (min_cost > cost)
            min_cost = cost;
    return min_cost;
}
```

In one arrangement, the intra/inter mode decision framework depicted by flowchart 800 in FIG. 8 is applied for H.264/MPEG-4 coding application. However, the proposed intra/inter mode decision framework is universal. For example, the invention can be applied to other video coding systems that accept pixel-domain intra predictive coding for encoding an Inter Picture such as the new AVS multimedia standard.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

What is claimed is:

1. A method for fast video encoding on a mobile device, comprising:
    estimating a rate-distortion cost for a plurality of predictors for coding a video;
    selecting a predictive coding mode for the video based on a minimization of the rate-distortion cost;

coding the image using the predictive mode associated with the minimum rate-distortion cost;

evaluating statistical information across the plurality of predictors collected from previous rate-distortion estimations; and providing an early termination for computing rate-distortion costs that exceed a threshold based on the statistical information;

wherein the estimating a rate-distortion cost is performed across a plurality of intra macro-block modes and a plurality of inter macro-block modes for reducing computational complexity associated with rate-distortion costs of intra macro-block modes;

wherein estimating a rate-distortion comprises:

computing an inter rate-distortion cost for coding using the inter macro-block modes;

setting the minimum rate-distortion cost to the inter rate-distortion cost; and comparing the inter rate-distortion cost to a first threshold;

wherein comparing the inter rate-distortion cost comprises:

if the inter rate-distortion cost is greater than the first threshold, then computing a first intra rate-distortion cost using a first intra macro-block mode for generating a coarse approximation of the rate-distortion cost; and if the inter rate-distortion cost is less than the first threshold, then not selecting the first Intra macro-block mode;

the method further comprising:

computing a second intra rate-distortion cost using a second Intra macro-block mode;

comparing the second intra rate-distortion cost to the minimum rate-distortion cost and updating a minimum rate-distortion cost based on the comparing;

wherein updating includes: setting the minimum rate-distortion cost to the second intra rate-distortion cost if the second intra rate-distortion cost is less than a current minimum rate-distortion cost;

the method further comprising:

comparing an approximated first intra rate-distortion cost to a second threshold; and if the approximated first intra rate-distortion cost is less than the second threshold, then refining the approximated first intra rate-distortion cost; and if the approximated first intra rate-distortion cost is greater than the second threshold, then not updating the approximated first intra rate-distortion cost in view that the first intra mode is unlikely to be an optimal macro-block.

2. The method of claim 1, wherein estimating a rate-distortion cost includes:

generating a coarse approximation of the rate-distortion cost of a predictor;

comparing the approximated rate-distortion cost to a threshold; and determining whether to refine the estimation of the rate-distortion cost based upon the comparison, wherein the rate-distortion cost is associated with a macro-block coding mode or type in a video coding system.

3. The method of claim 2, further comprising:

repeating the generating, comparing, and determining for the plurality of predictors; and selecting the predictor associated with the lowest rate-distortion cost.

4. The method of clam 1 wherein the first threshold can be adjusted dynamically.

5. The method of claim 1 further comprising:

comparing the inter rate-distortion cost, a first intra rate-distortion cost, and the second intra rate-distortion cost; and selecting a predicting mode corresponding to lowest rate-distortion cost;

wherein the predicting mode is an Inter macro-block mode or an intra macro-block mode.

* * * * *